US012577823B2

(12) United States Patent
Cavanaugh et al.

(10) Patent No.: US 12,577,823 B2
(45) Date of Patent: Mar. 17, 2026

(54) MULTI-PANEL DOOR SYSTEM, AND DUAL-SYNCHRONIZATION DRIVE ASSEMBLY FOR A MULTI-PANEL DOOR SYSTEM

(71) Applicant: Allegion Access Technologies LLC, Carmel, IN (US)

(72) Inventors: James Cavanaugh, Farmington, CT (US); Ronald Laliberte, Farmington, CT (US); Benjamin Marotte, Springfield, MA (US); Gregory John Oleksik, Carmel, IN (US)

(73) Assignee: Allegion Access Technologies LLC, Carmel, IN (US)

( * ) Notice: Subject to any disclaimer, the term of this patent is extended or adjusted under 35 U.S.C. 154(b) by 109 days.

(21) Appl. No.: 17/935,404

(22) Filed: Sep. 26, 2022

(65) Prior Publication Data

US 2023/0096802 A1 Mar. 30, 2023

Related U.S. Application Data

(60) Provisional application No. 63/248,817, filed on Sep. 27, 2021.

(51) Int. Cl.
*E05F 15/643* (2015.01)

(52) U.S. Cl.
CPC ....... *E05F 15/643* (2015.01); *E05Y 2201/652* (2013.01); *E05Y 2201/668* (2013.01); *E05Y 2900/132* (2013.01)

(58) Field of Classification Search
CPC .............. E05F 15/643; E05F 2017/005; E05F 17/002–004; E05F 15/632;
(Continued)

(56) References Cited

U.S. PATENT DOCUMENTS 3,072,394 A * 1/1963 Urquhart ............... E05F 17/004 49/102
4,142,326 A * 3/1979 Schmitz ................ E05F 15/643 49/118
(Continued)

FOREIGN PATENT DOCUMENTS

AT 397409 B * 2/1994 ............ E05F 17/002
EP 1544399 A2 * 6/2005 ............... E06B 3/50
(Continued)

OTHER PUBLICATIONS

CA Examination Report; Canadian Intellectual Property Office; Canadian Patent Application No. 3,176,099; Feb. 20, 2024; 5 pages.
(Continued)

*Primary Examiner* — Catherine A Kelly
*Assistant Examiner* — Patrick B. Ponciano
(74) *Attorney, Agent, or Firm* — Taft Stettinius & Hollister LLP

(57) ABSTRACT

A door system includes a multi-panel door and a dual-synchronization drive assembly for the door system. The dual-synchronization drive assembly has a structural configuration and functionality that combines a drive mechanism with a synchronization mechanism. The dual-synchronization drive assembly transmits a drive force in a manner that causes linear movement of door panels of the multi-panel door system between an open position and a closed position. The dual-synchronization drive assembly causes a synchronized movement of the door panels at different linear speeds/velocities to fully advance the door panels to the open position or the closed position simultaneously. The dual-synchronization drive assembly includes a dual gear unit that is configurable to allow for any motion/speed ratio necessary in order to obtain a specific performance objective of the door system.

19 Claims, 8 Drawing Sheets

(58) Field of Classification Search
CPC ......... E05Y 2201/652; E05Y 2201/668; E05Y 2201/62; E05Y 2900/51; E05Y 2900/531
See application file for complete search history.

(56) References Cited

U.S. PATENT DOCUMENTS

| | | | | | |
|---|---|---|---|---|---|
| 4,259,810 | A * | 4/1981 | West | E05F 15/40 | 474/169 |
| 4,781,270 | A * | 11/1988 | Holland | E05F 17/004 | 49/411 |
| 5,711,112 | A * | 1/1998 | Barten | E05F 15/643 | 49/118 |
| 5,755,060 | A * | 5/1998 | Zweili | E05B 65/0829 | 49/90.1 |
| 6,085,826 | A * | 7/2000 | Maesaki | A47H 5/0325 | 160/331 |
| 6,352,097 | B1 * | 3/2002 | Kern | E05F 15/643 | 160/202 |
| 6,612,358 | B2 | 9/2003 | Hay et al. | | |
| 6,880,610 | B1 * | 4/2005 | Bush | E05F 17/002 | 160/202 |
| 6,973,753 | B2 | 12/2005 | Liebscher | | |
| 7,290,369 | B2 * | 11/2007 | Tarrega Lloret | E05F 5/003 | 49/411 |
| 7,992,355 | B2 | 8/2011 | Bridgman et al. | | |
| 8,205,387 | B2 | 6/2012 | Ranaudo et al. | | |
| 8,424,244 | B2 * | 4/2013 | Tarrega Lloret | E05F 15/643 | 49/118 |
| 8,443,549 | B2 | 5/2013 | Salvietti et al. | | |
| 8,627,604 | B2 | 1/2014 | Seymour et al. | | |
| 8,708,026 | B2 * | 4/2014 | Graves | A47H 5/0325 | 160/330 |
| 8,826,598 | B2 | 9/2014 | Ranaudo et al. | | |
| 9,458,654 | B2 | 10/2016 | Palsson et al. | | |
| 9,637,970 | B1 | 5/2017 | Rendon, Jr. et al. | | |
| 9,903,148 | B2 | 2/2018 | Rodems et al. | | |
| 10,113,347 | B2 | 10/2018 | Wolfe | | |
| 10,196,815 | B2 * | 2/2019 | Dickson | E04B 2/827 | |
| RE47,380 | E | 5/2019 | Bridgman et al. | | |
| 10,280,678 | B1 | 5/2019 | Rendon, Jr. et al. | | |
| 10,513,876 | B2 | 12/2019 | Molloy et al. | | |
| 10,577,848 | B2 | 3/2020 | Rodems et al. | | |
| 10,718,150 | B2 | 7/2020 | Hall et al. | | |
| 10,808,446 | B2 | 10/2020 | Hall et al. | | |
| 10,890,016 | B2 | 1/2021 | Brewer | | |
| 10,920,477 | B2 * | 2/2021 | Akgor | E05F 15/77 | |
| 10,995,537 | B2 | 5/2021 | Hall et al. | | |
| 10,995,538 | B2 | 5/2021 | Hall et al. | | |
| 11,168,508 | B2 | 11/2021 | Dreyer | | |
| 11,274,490 | B2 | 3/2022 | Goldfinch et al. | | |
| 11,401,735 | B2 | 8/2022 | Schonberger | | |
| 11,440,775 | B2 * | 9/2022 | Kashiwakura | B66B 13/12 | |
| 11,448,003 | B2 | 9/2022 | Wolfe et al. | | |
| 11,492,832 | B2 | 11/2022 | Hernandez | | |
| 11,555,344 | B2 | 1/2023 | Patel et al. | | |
| 2004/0049984 | A1 * | 3/2004 | Pfaff | E05F 17/00 | 49/73.1 |
| 2008/0092445 | A1 | 4/2008 | Ramirez | | |
| 2010/0281776 | A1 | 11/2010 | Lloret | | |
| 2012/0117881 | A1 | 5/2012 | Seymour et al. | | |
| 2019/0309561 | A1 | 10/2019 | Hall et al. | | |
| 2021/0032905 | A1 | 2/2021 | Zhang et al. | | |
| 2021/0189788 | A1 * | 6/2021 | Dreyer | E05F 15/40 | |
| 2022/0098926 | A1 | 3/2022 | Comaglio | | |
| 2022/0136303 | A1 | 5/2022 | Martin et al. | | |
| 2022/0235593 | A1 | 7/2022 | Bai | | |
| 2023/0061488 | A1 | 3/2023 | Wolfe et al. | | |
| 2023/0086262 | A1 | 3/2023 | Erskine et al. | | |
| 2023/0088843 | A1 | 3/2023 | Oakes et al. | | |
| 2023/0110893 | A1 | 4/2023 | Stabile | | |
| 2024/0218721 | A1 * | 7/2024 | Romero | E05F 7/00 | |

FOREIGN PATENT DOCUMENTS

| | | | | |
|---|---|---|---|---|
| KR | 102035722 | B1 * | 5/2019 | |
| KR | 102117782 | B1 * | 6/2020 | E05F 17/004 |

OTHER PUBLICATIONS

CA Examination Report; Canadian Intellectual Property Office; Canadian Patent Application No. 3,176,099; Oct. 6, 2025; 4 pages.

* cited by examiner

MULTI-PANEL DOOR SYSTEM, AND DUAL-SYNCHRONIZATION DRIVE ASSEMBLY FOR A MULTI-PANEL DOOR SYSTEM

CROSS-REFERENCE TO RELATED APPLICATIONS

This application claims the benefit of U.S. Provisional Patent Application Ser. No. 63/248,817 filed on Sep. 27, 2021, the disclosure of which is incorporated herein by reference in its complete entirety.

TECHNICAL FIELD

One or more embodiments set forth herein relate to a multi-panel door system and a dual-synchronization drive assembly for such a multi-panel door system that is operable to cause synchronized actuation of a multi-panel door in a manner such that a drive force to initiate an opening/closing sequence to one door panel is synchronously transmitted to the other door panel.

BACKGROUND

There are known drive assemblies for multi-panel door systems having a plurality of linearly moveable panels. Such drive assemblies, however, have limitations and inconveniences.

SUMMARY

One or more embodiments includes a multi-panel door system, and a dual-synchronization drive assembly having a structural configuration that facilitates both the simultaneous displacement of at least two door panels in a synchronized manner and at different speeds.

The components of the multi-panel door system are integrated in a pulley with easy installation and mounting. This technical solution eliminates the requirement for a separate drive system and separate motion synchronization device.

The multi-panel door system in accordance with one or more embodiments comprises a dual-synchronization drive assembly that provides custom motion ratio or door panel speed/velocity for door panels of different or unequal door widths.

In accordance with one or more embodiments, an example door system comprises one or more of the following: a door having a plurality of door panels linearly movable between an open position and a closed position; and a drive assembly operable to drive the door panels between the open position and the closed position, the drive assembly including: a dual gear unit operatively connected to the door panels to cause a synchronized linear movement of the door panels at different speeds which fully advances the door panels to the open position or the closed position simultaneously; and a transmission assembly including a first transmission belt operatively connected to the dual gear unit to transmit a drive power to a first door panel of the plurality of door panels which advances the first door panel between the open position and the closed position, and a second transmission belt operatively connected to the dual gear unit to transmit the drive power to a second door panel of the plurality of door panels which advances the second door panel between the open position and the closed position.

In accordance with one or more embodiments, another example door system comprises one or more of the following: a door having a plurality of door panels linearly movable between an open position and a closed position; and a drive assembly operable to generate a drive power to drive the door panels between the open position and the closed position at different speeds in a manner that synchronizes the linear movement of the door panels to fully advance the door panels to the open position or the closed position simultaneously.

In accordance with each example door system, the plurality of door panels comprises: a first door panel having a first width, and a second door panel having a second width that is different than the first length.

In accordance with each example door system, a carrier assembly is provided to operatively connect the door panels to the transmission assembly.

In accordance with each example door system, the carrier assembly comprises a first carrier member operable to connect the first door panel to the first transmission belt.

In accordance with each example door system, the carrier assembly comprises a second carrier member operable to connect the second door panel to the second transmission belt.

In accordance with each example door system, the dual gear unit comprises: a first gear operatively connected to the first transmission belt, and a second gear operatively connected to the second transmission belt.

In accordance with each example door system, an electro-mechanical actuation device is provided to generate drive power which simultaneously drives the first gear and the second gear.

In accordance with each example door system, a control device is provided to control the electro-mechanical actuation device.

In accordance with one or more embodiments, an example drive assembly is provided for a door system that includes a door having a plurality of door panels, the example drive assembly comprising one or more of the following: a dual gear unit operatively connected to the door panels to cause a synchronized linear movement of the door panels at different speeds which fully advances the door panels to the open position or the closed position simultaneously, the dual gear unit including a rotatable first gear operatively connected to the first transmission belt, and a rotatable second gear operatively connected to the second transmission belt; a first transmission belt operatively connected to the first gear to transmit a drive power to a first door panel of the plurality of door panels which advances the first door panel between an open position and a closed position; and a second transmission belt operatively connected to the second gear to transmit the drive power to a second door panel of the plurality of door panels which advances the second door panel between the open position and the closed position.

In accordance with the example drive assembly, an electro-mechanical actuation device is provided to generate drive power which simultaneously drives the first gear and the second gear.

In accordance with the example drive assembly, a control device is provided to control the electro-mechanical actuation device.

DRAWINGS

The various advantages of the exemplary embodiments will become apparent to one skilled in the art by reading the following specification and appended claims, and by referencing the following drawings, in which:

DESCRIPTION

One or more embodiments set forth, illustrated, and described herein relate to a door system that includes a multi-panel door, and a dual-synchronization drive assembly for the door system. The dual-synchronization drive assembly has a structural configuration and functionality that combines a drive mechanism with a synchronization mechanism. The dual-synchronization drive assembly transmits a drive force in a manner that causes linear movement of door panels of the multi-panel door system between an open position and a closed position. The dual-synchronization drive assembly causes a synchronized movement of the door panels at different linear speeds/velocities to fully advance the door panels to the open position or the closed position simultaneously. The dual-synchronization drive assembly includes a dual gear unit that is configurable to allow for any motion/speed ratio necessary in order to obtain a specific performance objective of the door system.

The dual-synchronization drive assembly comprises a dual gear unit that simultaneously drives two transmission belts. The dual-synchronization drive assembly facilitates use of door panels of different widths by allowing one door panel to linearly move at a velocity that is greater than another door panel in order that all door panels fully reach the open position or the closed position simultaneously.

The synchronization of movement and speed/velocity of the door panels maximizes the clear door opening (CDO) when the door panels are advanced to a complete or fully open position. The dual-synchronization drive assembly is operable to convert rotational motion from an output shaft of an electric drive motor to linear motion of the door panels in order that the door panels reach the open position or the closed position simultaneously without restriction while maintaining a proper door panel overlap. By combining the drive system and synchronization mechanism, the dual-synchronization drive assembly has a much smaller footprint with fewer moving mechanical parts.

Figure 1:
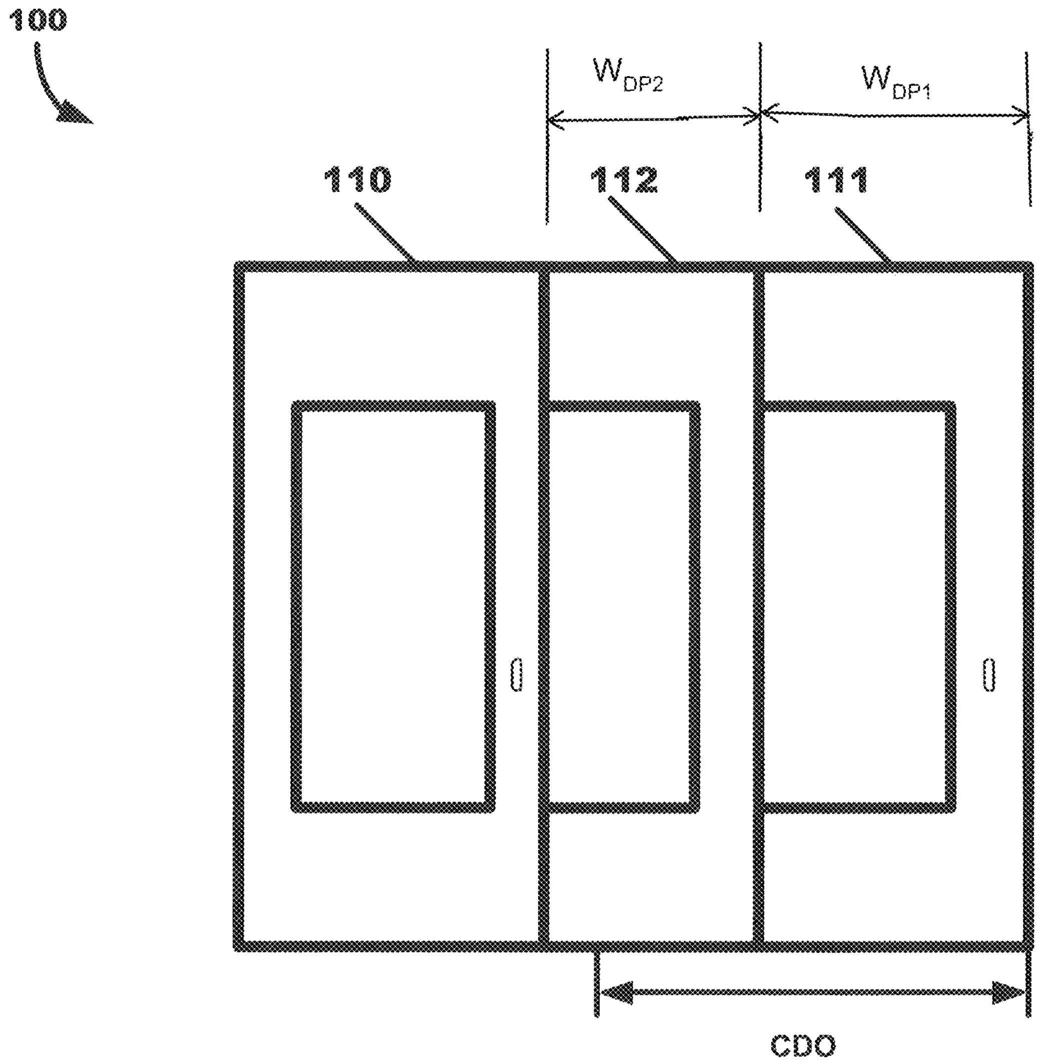
FIG. 1 illustrates a front view of a multi-panel door system, in accordance with one or more embodiments set forth, described, and/or illustrated herein.

As illustrated in FIG. 1, an example multi-panel door system 100 comprises a door having a plurality of door panels, including but not limited to a stationary door panel 110, a first linearly moveable door panel 111, and a second linearly moveable door panel 112 that are movable along a horizontal axis between an open position and a closed position. In the illustrated embodiment of FIG. 1, the door comprises two linearly moveable door panels. Embodiments, however, are not limited thereto, and thus, this disclosure contemplates the door comprising any suitable number of linearly moveable door panels that falls within the spirit and scope of the principles of this disclosure.

In accordance with one or more embodiments, the door may include door panels of varying, i.e., different widths. For example, the first linearly moveable door panel 111 may have a first width $w_{DP1}$, and the second linearly moveable door panel 112 may have a second width $w_{DP2}$ that is different than the first width $w_{DP1}$. The first width $w_{DP1}$ may be greater than second width $w_{DP2}$.

Figure 2:
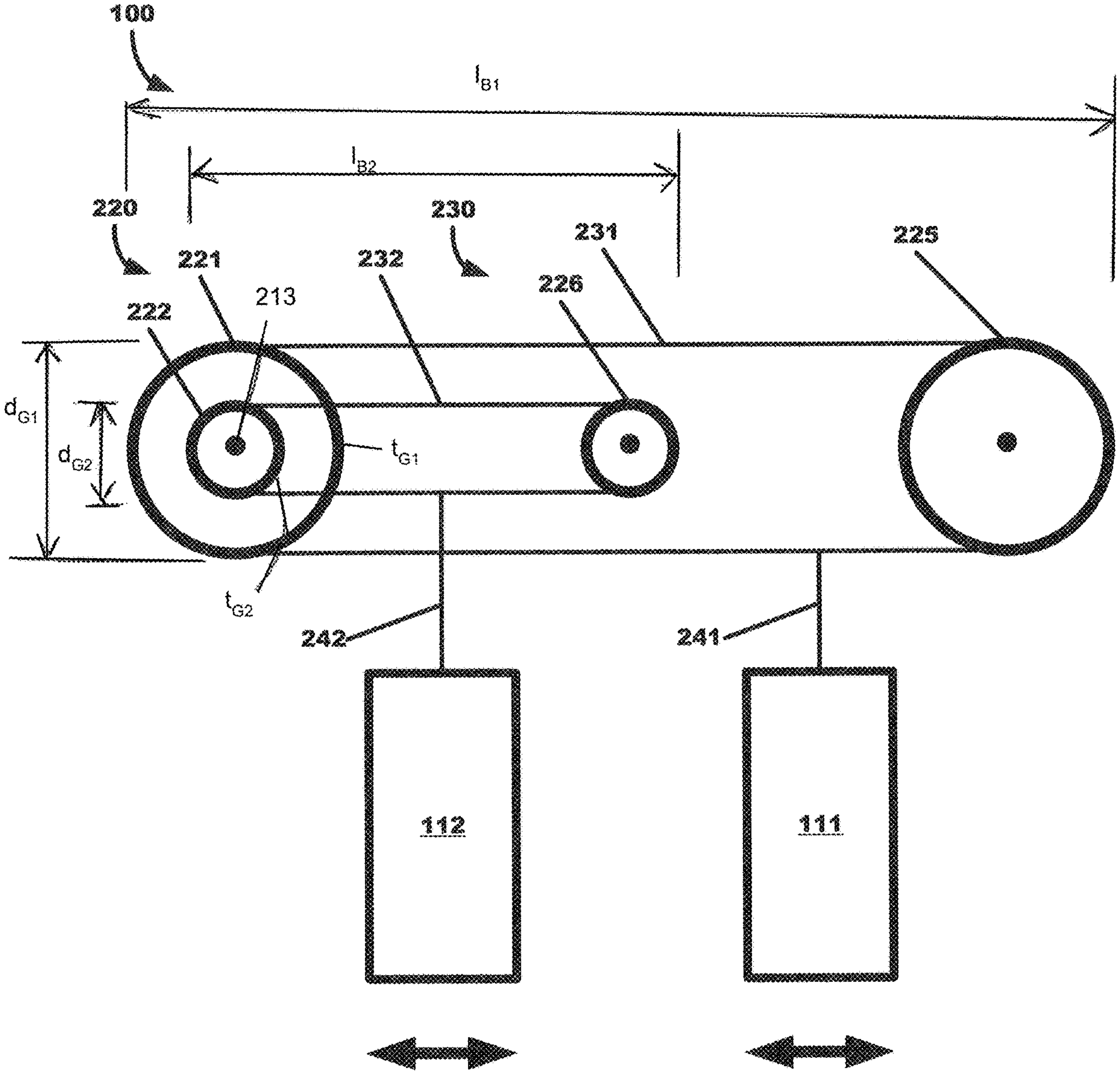
FIG. 2 illustrates the multi-panel door system of FIG. 1.
Figure 3:
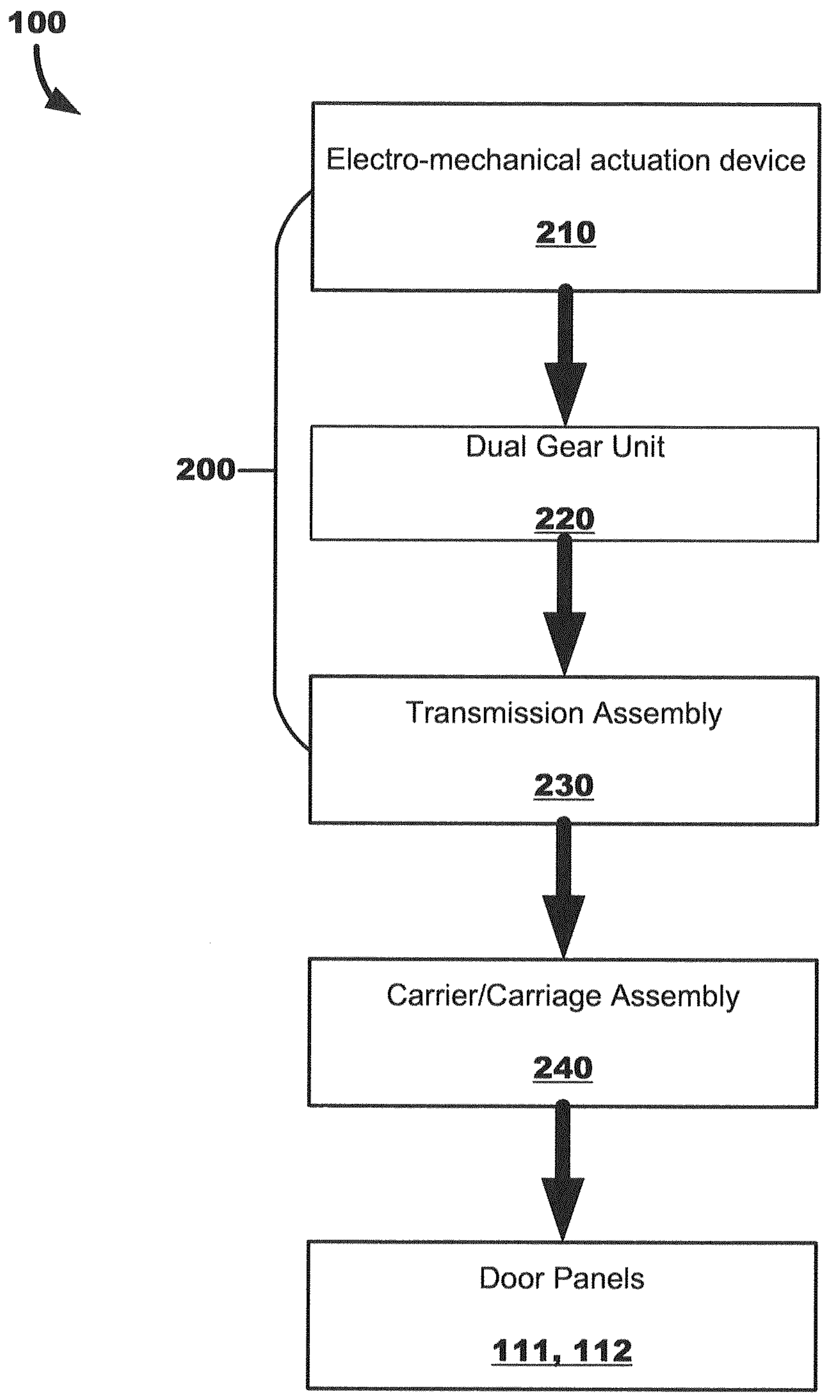
FIG. 3 illustrates a block diagram of the multi-panel door system of FIG. 1.

As illustrated in FIGS. 2 and 3, the example multi-panel door system 100 further comprises a dual-synchronization drive assembly 200 operable to drive the door, i.e., the first linearly moveable door panel 111 and the second linearly moveable door panel 112, between an open position and a closed position. The dual-synchronization drive assembly 200 comprises an electro-mechanical actuation device 210, a double or dual gear unit 220, and a transmission assembly 230. The direction the first linearly moveable door panel 111 and the second linearly moveable door panel 112 respectively advance between the open position and the closed position is indicated by arrows in FIG. 2. In spite of the difference in widths, the dual-synchronization drive assembly 200 causes a synchronized movement of the first linearly moveable door panel 111 and the second linearly moveable door panel 112 at different linear speeds/velocities to fully advance the first linearly moveable door panel 111 and the second linearly moveable door panel 112 to the open position or the closed position simultaneously.

Electro-Mechanical Actuation Device

The electro-mechanical actuation device 210 is operable to generate an actuation force. As further disclosed in detail herein, in accordance with one or more embodiments, the electro-mechanical actuation device 210 may be controlled by a control device 260 (FIG. 4) in a manner which optimizes the performance of the electro-mechanical actuation device 210, and particularly, the multi-panel door system 100.

Figure 7:
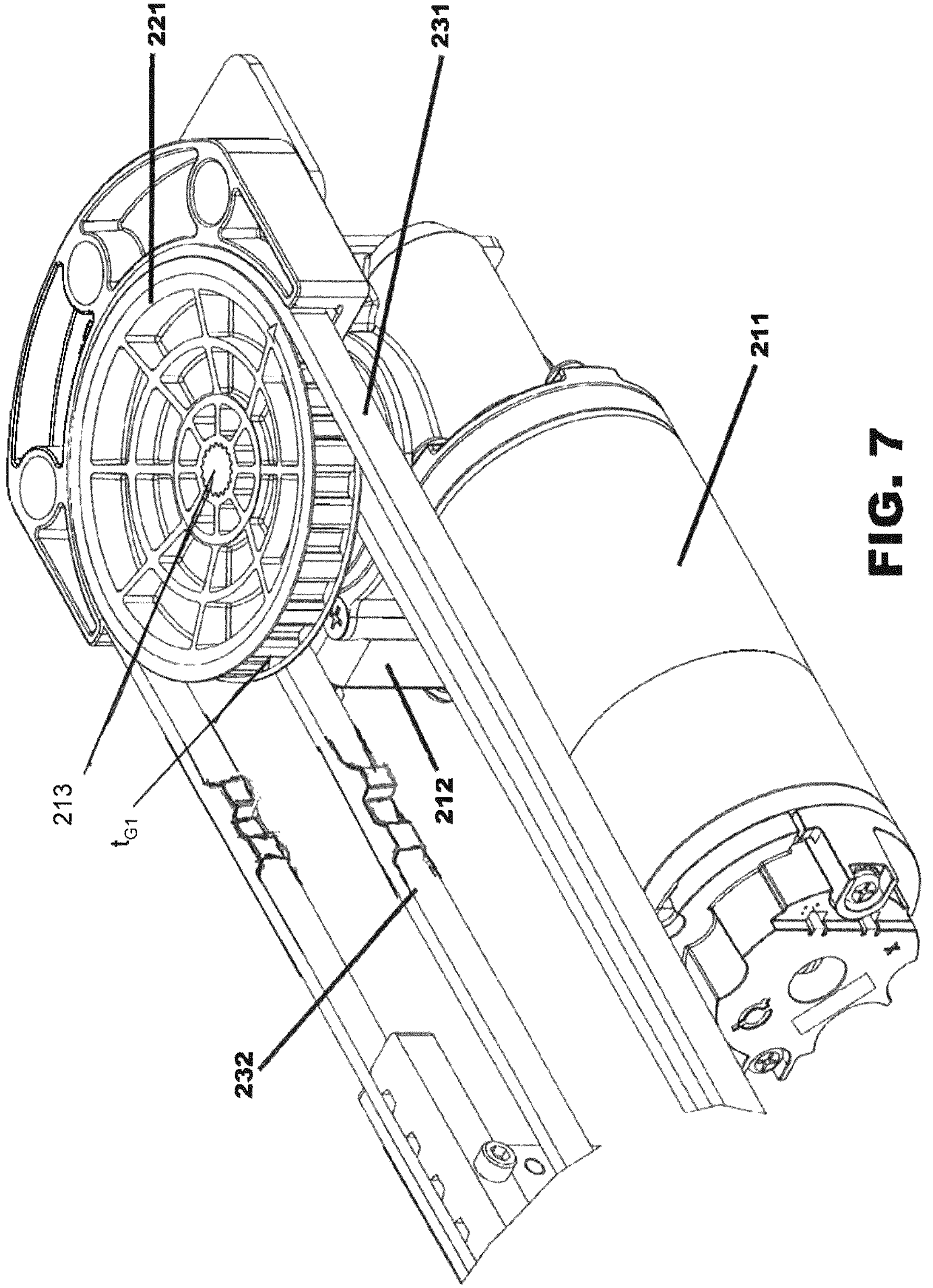
FIG. 7 illustrates a sectional view of the dual-synchronization drive assembly of the multi-panel door system of FIG. 1.
Figure 8:
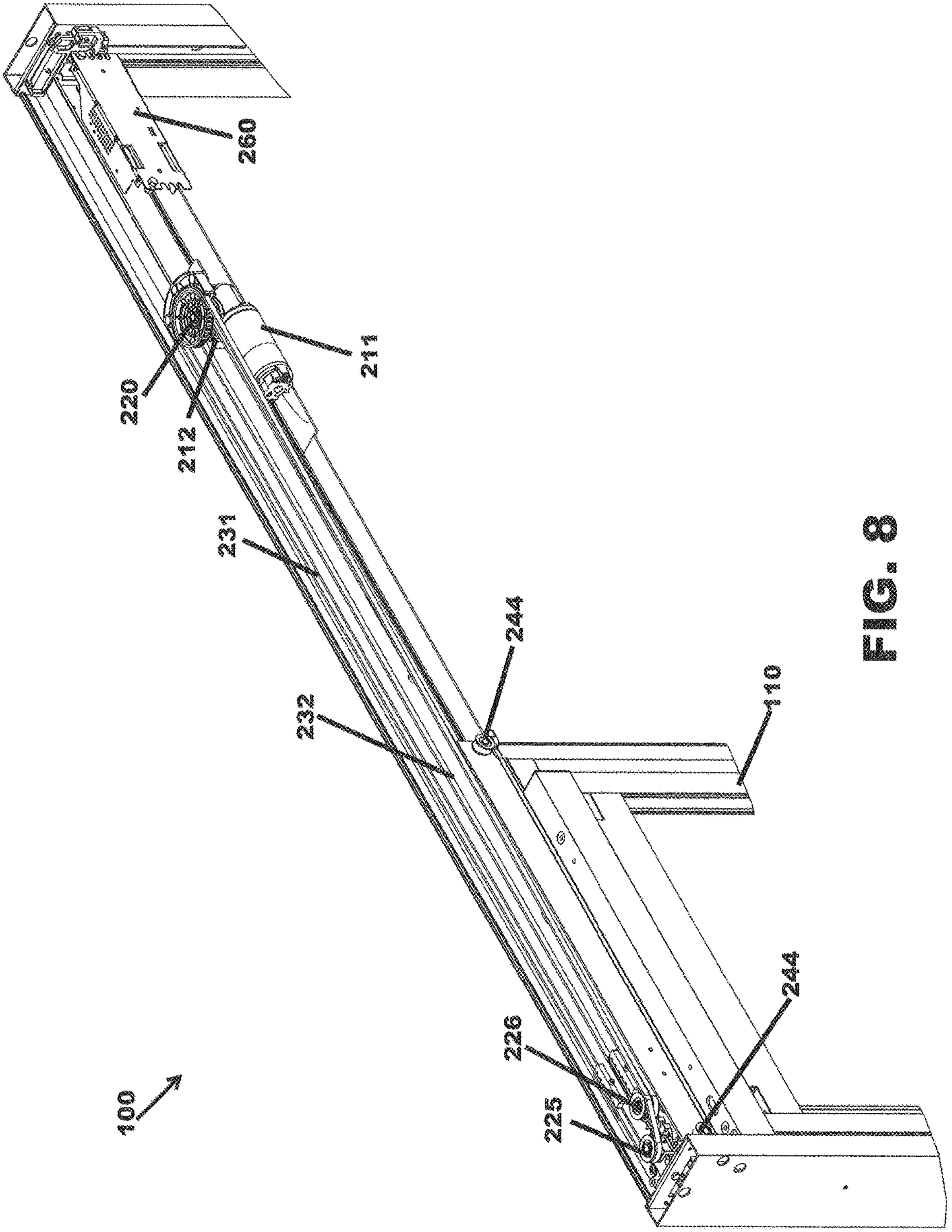
FIG. 8 illustrates a perspective view of the multi-panel door system of FIG. 1.

The electro-mechanical actuation device 210 may comprise an electric drive motor 211 that is operably connected to a gear box 212 (FIG. 7). The electric drive motor 211 is operable to generate drive power to apply an amount of torque to an output drive shaft 213 that is rotatable in clockwise and counterclockwise directions to drive dual gear unit 220. Alternatively, this disclosure contemplates driving the dual gear unit 220 manually by a person sliding the door panels 111, 112 via manually-applied force. The electric drive motor 210 may be implemented as a brushless motor, a variable electric motor, a servomotor, a stepper motor, and the like. Embodiments, however, are not limited thereto, and thus, this disclosure contemplates the electro-mechanical actuation device 210 comprising any suitable actuation device that falls within the spirit and scope of the principles of this disclosure.

Figure 4:
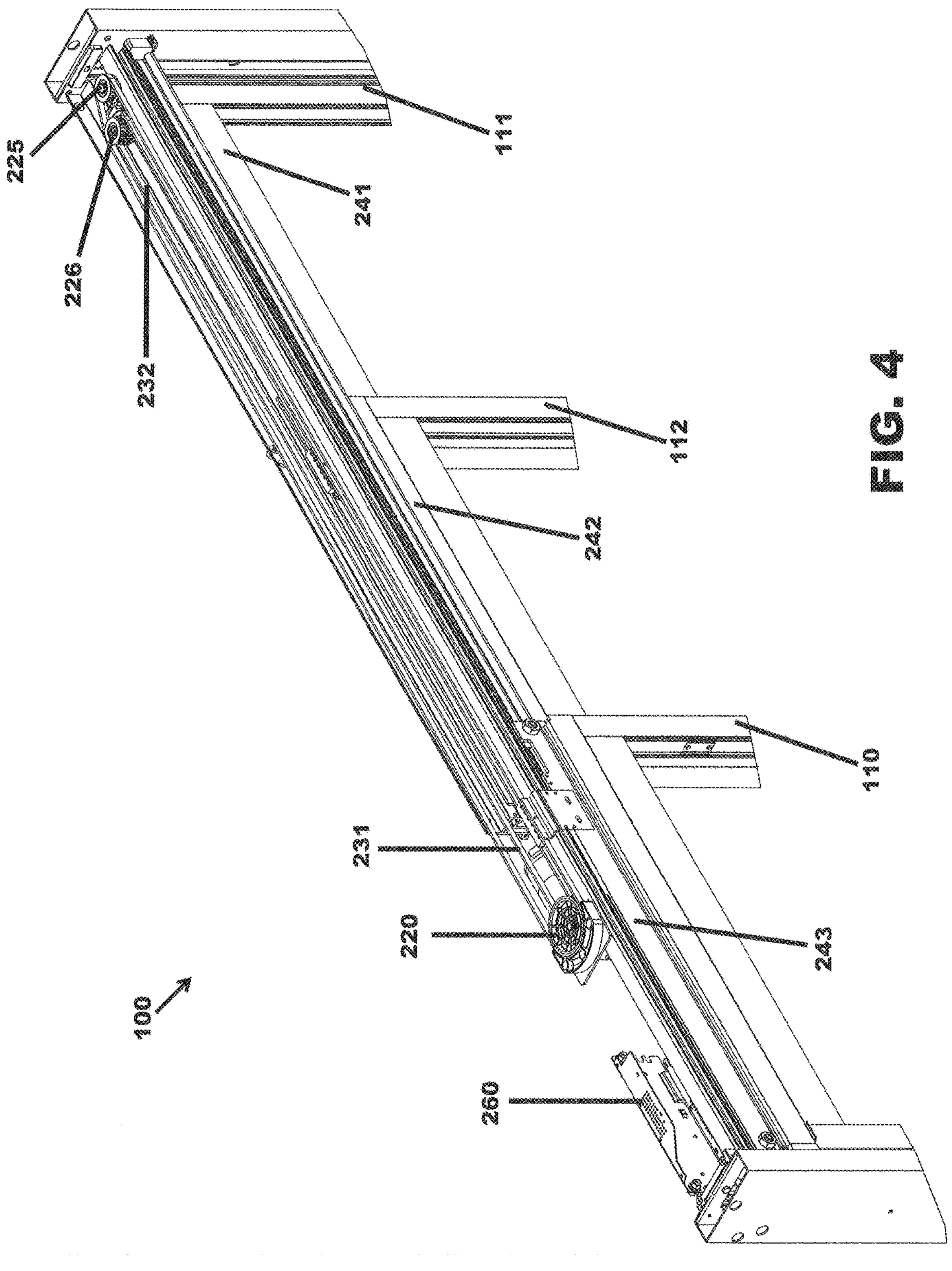
FIG. 4 illustrates a perspective view of the dual synchronization drive assembly of the multi-panel door system of FIG. 1.
Figure 5:
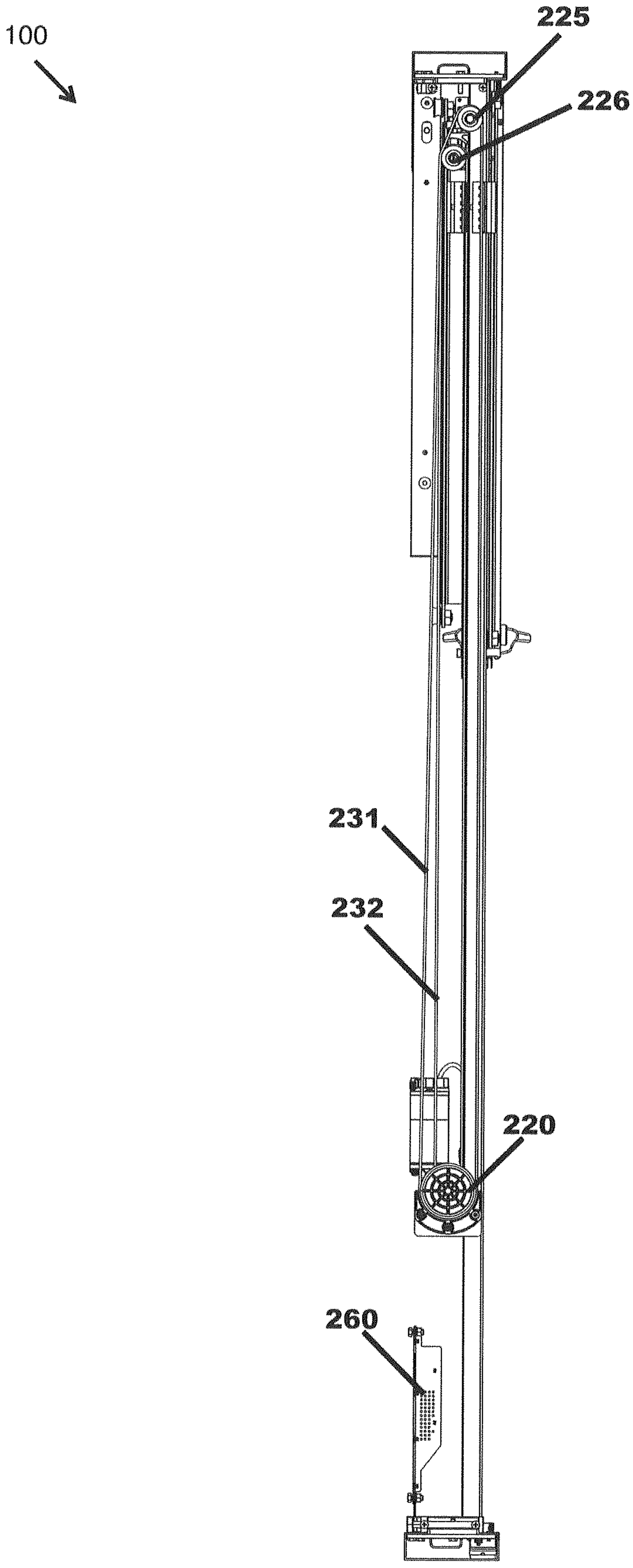
FIG. 5 illustrates a top view of a dual-synchronization drive assembly of the multi-panel door system of FIG. 1.
Figure 6:
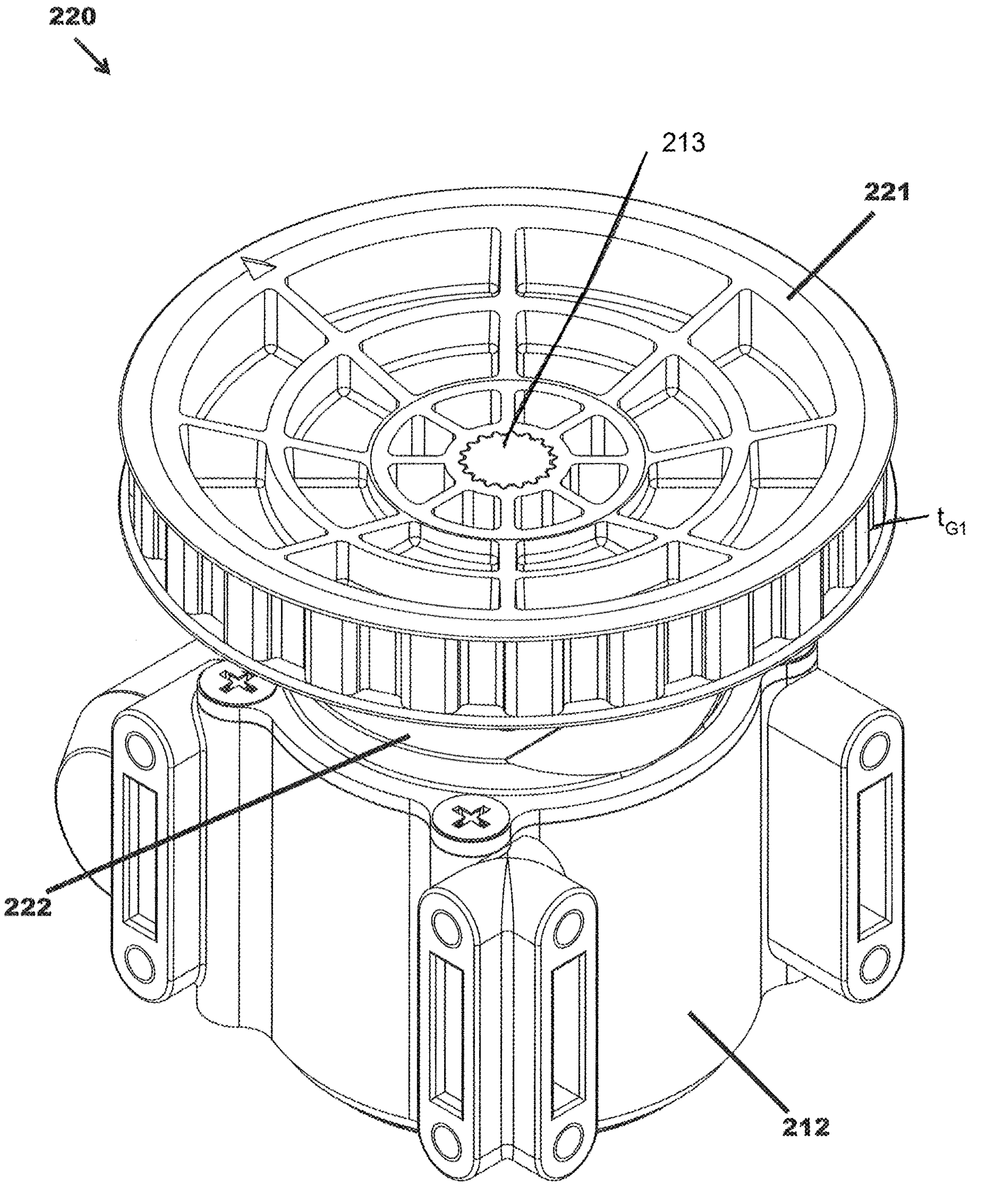
FIG. 6 illustrates a dual gear unit of the dual-synchronization drive assembly.

As illustrated in FIGS. 4 and 5, a control device 260 is provided to control the electro-mechanical actuation device 210. The control device 260 comprises one or more processors and a non-transitory memory operatively coupled to the one or more processors comprising a set of instructions executable by the one or more processors to cause the one or more processors to execute one or more one or more instructions to control the electro-mechanical actuation device 210. Examples of suitable non-transitory machine- or computer-readable storage medium include, but are not limited to: RAM (Random Access Memory), flash memory, ROM (Read Only Memory), PROM (Programmable Read- Only Memory), EPROM (Erasable Programmable Read-Only Memory), EEPROM (Electrically Erasable Programmable Read-Only Memory), field programmable gate arrays (FPGAs), complex programmable logic devices (CPLDs), fixed-functionality logic hardware using circuit technology such as, for example, application specific integrated circuit (ASIC), complementary metal oxide semiconductors (CMOS) or transistor-transistor logic (TTL) technology, registers, magnetic disks, optical disks, hard drives, or any other suitable storage medium, or any combination thereof. As an example, software executed on one or more computer devices or computer systems may provide functionality described or illustrated herein.

In accordance with one or more embodiments set forth, described, and/or illustrated herein, "processor" means any component or group of components that are configured to execute any of the processes described herein or any form of instructions to carry out such processes or cause such processes to be performed. The one or more processors may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors may comprise at least one hardware circuit (e.g., an integrated circuit) configured to carry out one or more instructions contained in program code. In embodiments in which there is a plurality of processors, such processors may work independently from each other, or one or more processors in the plurality may work in combination with each other.

Dual Gear Unit

As illustrated in FIGS. 4-8, the dual gear unit 220, supported by the output drive shaft 213, has a structural configuration that is operable to cause synchronized movement of the first linearly moveable door panel 111 and the second linearly moveable door panel 112 at different linear speeds/velocities in order that the first linearly moveable door panel 111 and the second linearly moveable door panel 112 fully reach the open position or the closed position simultaneously. The dual gear unit 220 comprises a rotatable first gear 221 and a rotatable second gear 222 that, in an automated embodiment, are respectively driven by the output drive shaft 213.

The first gear 221, having a first diameter $d_{G1}$, includes a plurality of external gear teeth $t_{G1}$. The second gear 222, having a second diameter $d_{G2}$, has a plurality of external gear teeth $t_{G2}$. In accordance with one or more embodiments, the first gear 221 has an overall diameter that is greater than the overall diameter of the second gear 222 (i.e., $d_{G1}>d_{G2}$). Meaning, the diameter ratio of the first gear 221 to the second gear 222 is x:y, where x>y. Moreover, the first gear 221 has a greater number of external gear teeth than the second gear 222 (i.e., $t_{G1}>t_{G2}$). The ratio of external gear teeth on the first gear 221 and the second gear 222 determine the motion ratio and linear speed/velocity of the first linearly moveable door panel 111 and the second linearly moveable door panel 112. The diameter ratio and the ratio of external gear teeth are adjustable to accommodate performance objections.

Although the illustrated embodiment shows a dual gear unit 220 for implementation in the example multi-panel door system 100, embodiments are not limited thereto. This disclosure contemplates the dual-synchronization drive assembly 200 may include other suitable gear architectures. For example, the dual-synchronization drive assembly 200 may include gear architecture in which a plurality of gears is not coupled together, and thus, may operate independently of each other.

Transmission Assembly

As illustrated in FIGS. 2, 4, 7, and 8, the transmission assembly 230 comprises a first transmission belt 231 and a second transmission belt 232.

The first transmission belt 231 is operatively connected to the first gear 221 and a stationary main gear 225 to transmit the drive power of the electro-mechanical actuation device 210 to the first linearly moveable door panel 111. The first transmission belt 231, having a first belt length $l_{B1}$, has a plurality external teeth (such as exemplarily shown along a portion of length $L_{B1}$ of first transmission belt 231 in FIG. 7) that, in operation, mesh with or otherwise operatively engages the external gear teeth of the first gear 221 to bidirectionally advance the first linearly moveable door panel 111 between the open position and the closed position. The second transmission belt 232 is operatively connected to the second gear 222 and a stationary secondary gear 226 to transmit the drive power of the electro-mechanical actuation device 210 to the second linearly moveable door panel 112. The second transmission belt 232, having a second belt length $l_{B2}$, has a plurality external teeth (such as exemplarily shown along a portion of length $L_{B2}$ of second transmission belt 232 in FIG. 7) that, in operation, mesh with or otherwise operatively engages the external gear teeth of the second gear 222 to bidirectionally advance the second linearly moveable door panel 112 (simultaneously with the bidirectional advancement of the first linearly moveable door panel 111) between the open position and the closed position. In accordance with one or more embodiments, the first transmission belt 231 is greater in size than the second transmission belt 232. Meaning, the first transmission belt 231 has a belt length that is greater than the belt length of the second transmission belt 232 (i.e., $l_{B1}>l_{B2}$).

Carrier Assembly

As illustrated in FIG. 4, the door system 100 further includes a carrier or carriage assembly 240 to operatively connect the first linearly moveable door panel 111 and the second linearly moveable door panel 112 to the transmission assembly 230. The carrier assembly 240 comprises a first carrier member 241 and a second carrier member 242. A third carrier member 243 is operable to connect to a third door panel, which could be a stationary door panel or a linearly moveable door panel. One or more of the carrier members 241, 242, 243 may include one or more wheel members 244 operable to roll along a portion or part of at least another adjacent carrier member along a horizontal axis.

The first carrier member 241 is operable to connect the first linearly moveable door panel 111 to the first transmission belt/pulley 231. The first carrier member 241 may be implemented as a bracket or header that is connected at an upper region thereof to the first transmission belt 231 and at an opposite lower region thereof to the first linearly moveable door panel 111. The lower region of the bracket may include spaced-apart flanges that define a space or opening which is sized to receive an upper region or header of the first linearly moveable door panel 111. Embodiments, however, are not limited thereto, and thus, this disclosure contemplates the first carrier member 241 being connected to the first linearly moveable door panel 111 via any suitable connection architecture.

The second carrier member 242 is operable to connect the second linearly moveable door panel 112 to the second transmission belt 232. The second carrier member 242 may be implemented as a bracket or header that is connected at an upper region thereof to the second transmission belt 232 and at an opposite lower region thereof to the second linearly moveable door panel 112. The lower region of the bracket may include spaced-apart flanges that define a space or opening which is sized to receive an upper region or header of the second linearly moveable door panel 112. Embodiments, however, are not limited thereto, and thus, this disclosure contemplates the second carrier member 242 being connected to the second linearly moveable door panel 112 via any suitable connection architecture.

The example and alternative embodiments described above may be combined in a variety of ways with each other. It should be noted that the present disclosure may, however, be embodied in many different forms and should not be construed as limited to the embodiments set forth herein; rather, the embodiments set forth herein are provided so that the disclosure will be thorough and complete, and will fully convey the scope of the invention to those skilled in the art. Furthermore, the steps and number of the various steps illustrated in the figures may be adjusted from that shown. The accompanying figures and attachments illustrate exemplary embodiments of the invention.

For definitional purposes and as used herein, "connected" or "attached" includes physical or electrical, whether direct or indirect, affixed or adjustably mounted. Thus, unless specified, "connected" or "attached" is intended to embrace any operationally functional connection.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A door system, comprising:

a door having a plurality of door panels of different widths that are each linearly movable between an open position and a closed position; and a drive assembly operable to drive the door panels between the open position and the closed position, the drive assembly including:

a dual gear unit operatively connected to the door panels, wherein the dual gear unit includes a first gear and a second gear;

a transmission assembly including a first transmission belt operatively connected to the first gear of the dual gear unit to transmit a drive power to a first door panel of the plurality of door panels which advances the first door panel between the open position and the closed position, and a second transmission belt operatively connected to the second gear of the dual gear unit to transmit the drive power to a second door panel of the plurality of door panels which advances the second door panel between the open position and the closed position;

a stationary main gear and a stationary secondary gear, the stationary secondary gear rotatable about an axis located between a rotation axis of the stationary main gear and the dual gear unit, wherein the first transmission belt consists of a single belt having a first belt length, wherein the first belt length is sized so that the first transmission belt extends around and operatively engages the first gear and the stationary main gear to operatively connect the first gear of the dual gear unit to the stationary main gear, wherein the second transmission belt has a second belt length that is less than the first belt length, and wherein the second belt length is sized so that the second transmission belt extends around and operatively engages the second gear and the stationary secondary gear to operatively connect the second gear of the dual gear unit to the stationary secondary gear; and an electro-mechanical actuation device including an electric drive motor between one of the plurality of door panels and the dual gear unit, the electric motor operatively coupled to a drive shaft, wherein the dual gear unit is supported by the drive shaft, the electric drive motor operable to generate the drive power which simultaneously drives the first gear and the second gear of the dual gear unit via the drive shaft to linearly move the plurality of door panels of different widths in the same direction at different speeds to synchronize advancement of the plurality of door panels to the open position or the closed position simultaneously.

2. The door system of claim 1, wherein the first door panel has a first width; and wherein the second door panel has a second width that is different than the first width.

3. The door system of claim 1, further comprising a carrier assembly to operatively connect the first and second door panels to the transmission assembly.

4. The door system of claim 3, wherein the carrier assembly comprises a first carrier member operable to connect the first door panel to the first transmission belt.

5. The door system of claim 4, wherein the carrier assembly comprises a second carrier member operable to connect the second door panel to the second transmission belt.

6. The door system of claim 1, further comprising a control device to control the electro-mechanical actuation device.

7. A door system, comprising:

a door having a plurality of door panels of different widths that are each linearly movable between an open position and a closed position; and a drive assembly operable to generate a drive power to drive the plurality of door panels of different widths between the open position and the closed position at different speeds in a manner that synchronizes linear movement of the plurality of door panels to fully advance the plurality of door panels to the open position or the closed position simultaneously, wherein the drive assembly includes:

a dual gear unit including a first gear and a second gear, the first gear and the second gear mounted to a drive shaft;

a stationary main gear and a stationary secondary gear, the stationary secondary gear rotatable about an axis located between a rotation axis of the stationary main gear and the dual gear unit;

a first transmission belt consisting of a single belt having a first belt length, and wherein the first belt length is sized so that the first transmission belt extends around and meshes with each of the first gear and the stationary main gear to operatively connect the first gear and the stationary main gear to transmit the drive power from the drive shaft to a first door panel of the plurality of door panels and advance the first door panel between the open position and the closed position; and a second transmission belt having a second belt length that is less than the first belt length, and wherein the second belt length is sized so that the second transmission belt extends around and meshes with each of the second gear and the stationary secondary second gear to operatively connect the second gear and the stationary secondary gear to transmit the drive power from the drive shaft to a second door panel of the plurality of door panels and advance the second door panel in the same direction as the first door panel between the open position and the closed position.

8. The door system of claim 7, wherein the drive assembly further comprises an electro-mechanical actuation device including an electric motor between one of the plurality of door panels and the dual gear unit, the electric motor generating the drive power which simultaneously drives the first gear and the second gear with the drive shaft to linearly move the plurality of door panels of different widths in the same direction at different speeds to synchronize advancement of the plurality of door panels to the open position or the closed position simultaneously.

9. The door system of claim 7, wherein the drive assembly includes a transmission assembly, the transmission assembly including the first transmission belt and the second transmission belt.

10. The door system of claim 9, further comprising a carrier assembly operatively connecting the first and second door panels to the transmission assembly.

11. The door system of claim 10, wherein the carrier assembly comprises a first carrier member operable to connect the first door panel to the first transmission belt.

12. The door system of claim 11, wherein the carrier assembly comprises a second carrier member operable to connect the second door panel to the second transmission belt.

13. The door system of claim 7, wherein the first door panel has a first width; and wherein the second door panel has a second width that is different than the first width.

14. The door system of claim 8, further comprising a control device to control the drive assembly.

15. A drive assembly for a door system that includes a door having a plurality of door panels of different widths that are each movable between an open position and a closed position, the drive assembly comprising:

a dual gear unit operatively connected to the plurality of door panels of different widths to cause a synchronized linear movement of the plurality of door panels of different widths at different speeds which fully advances the door panels to the open position or the closed position simultaneously, the dual gear unit including a drive shaft, the dual gear unity comprising:

a rotatable first gear mounted to the drive shaft and operatively connected to a first transmission belt; and a rotatable second gear mounted to the drive shaft and operatively connected to a second transmission belt;

the first transmission belt consisting of a single belt having a first belt length sized so that the first transmission belt extends around and operatively engages the rotatable first gear and a stationary main gear to operatively connect the rotatable first gear and the stationary main gear to transmit a drive power to a first door panel of the plurality of door panels which advances the first door panel between the open position and the closed position; and the second transmission belt having a second belt length that is less than the first belt length, the second belt length sized so that the second transmission belt extends around and operatively engages the rotatable second gear and a stationary secondary second gear to operatively connect the rotatable second gear and the stationary secondary gear to transmit the drive power to a second door panel of the plurality of door panels which advances the second door panel in the same direction as the first door panel between the open position and the closed position, and wherein the stationary secondary gear rotates about an axis that is located between a rotation axis of the stationary main gear and the dual gear unit.

16. The drive assembly of claim 15, further comprising an electro-mechanical actuation device including an electric motor between one of the plurality of door panels and the dual gear unit, the electric motor generating the drive power to rotate the drive shaft which simultaneously drives the rotatable first gear and the rotatable second gear to linearly move the plurality of door panels of different widths in the same direction at different speeds to synchronize advancement of the plurality of door panels to the open position or the closed position simultaneously.

17. The drive assembly of claim 16, further comprising a control device to control the electro-mechanical actuation device.

18. The drive assembly of claim 15, wherein the rotatable first gear has a first diameter and a first number of external teeth and the rotatable second gear has a second diameter and a second number of external teeth, the first diameter being greater than the second diameter and the first number of external teeth being greater than the second number of external teeth.

19. The door system of claim 7, wherein the first gear has a first diameter and a first number of external teeth, wherein the second gear has a second diameter and a second number of external teeth, and wherein the first diameter is greater than the second diameter and the first number of external teeth is greater than the second number of external teeth.

* * * * *